US010815851B1

(12) United States Patent
Brunel et al.

(10) Patent No.: US 10,815,851 B1
(45) Date of Patent: Oct. 27, 2020

(54) DEVICE FOR PURIFYING THE EXHAUST GASES OF A VEHICLE

(71) Applicant: FAURECIA SYSTEMES D'ECHAPPEMENT, Nanterre (FR)

(72) Inventors: Jean Paul Brunel, Montbeliard (FR); Guillaume Aufranc, Courcelles-les-Montbeliard (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 0 days.

(21) Appl. No.: 16/927,004

(22) Filed: Jul. 13, 2020

(30) Foreign Application Priority Data

Jul. 17, 2019 (FR) ...................... 19 08076

(51) Int. Cl.
| | | |
|---|---|---|
| *F01N 3/20* | (2006.01) | |
| *F01N 3/26* | (2006.01) | |
| *F01N 3/28* | (2006.01) | |
| *F01N 3/08* | (2006.01) | |

(52) U.S. Cl.
CPC ............ *F01N 3/2013* (2013.01); *F01N 3/26* (2013.01); *F01N 3/2839* (2013.01); *F01N 3/0892* (2013.01); *F01N 2240/16* (2013.01); *F01N 2450/24* (2013.01); *F01N 2490/16* (2013.01)

(58) Field of Classification Search
CPC ........ F01N 3/26; F01N 3/2013; F01N 3/2839; F01N 3/0892; F01N 2240/16; F01N 2450/24; F01N 2490/16
USPC ................ 422/186.01–186.06, 174
See application file for complete search history.

(56) References Cited

U.S. PATENT DOCUMENTS

| | | | | | |
|---|---|---|---|---|---|
| 5,393,499 | A | * | 2/1995 | Bagley | .................. F01N 3/2026 422/174 |
| 5,569,455 | A | * | 10/1996 | Fukui | .................... F01N 3/2807 422/174 |
| 6,235,254 | B1 | * | 5/2001 | Murphy | ................ F01N 13/009 423/212 |
| 7,655,065 | B2 | * | 2/2010 | Gonze | .................... F01N 9/002 55/523 |

(Continued)

FOREIGN PATENT DOCUMENTS

| | | |
|---|---|---|
| CN | 107387213 A | 11/2017 |
| EP | 1120551 A2 | 8/2001 |
| EP | 1120551 A3 | 1/2004 |

OTHER PUBLICATIONS

French Search Report dated Jan. 28, 2020.

*Primary Examiner* — Tom P Duong
(74) *Attorney, Agent, or Firm* — Carlson, Gaskey & Olds, P.C.

(57) ABSTRACT

An exhaust gas purification device for a vehicle comprises a coil configured to generate an electromagnetic field, a magnetic flux concentrator, surrounding the coil and configured to conduct the electromagnetic field generated by the coil, and an exhaust gas purification substrate. The exhaust gas purification substrate comprises an upstream segment having an upstream section, and a downstream segment having a downstream section. The exhaust gas purification substrate further comprises at least one intermediate segment between the upstream segment and the downstream segment, the intermediate segment having a central section smaller than the upstream section and/or the downstream section.

20 Claims, 3 Drawing Sheets

(56) References Cited

U.S. PATENT DOCUMENTS

| | | | |
|---|---|---|---|
| 8,968,666 B2* | 3/2015 | Gonze | F01N 3/2026 422/168 |
| 9,617,888 B2* | 4/2017 | Crawford | F01N 3/2026 |
| 2017/0022868 A1 | 1/2017 | Crawford et al. | |
| 2017/0145886 A1* | 5/2017 | Crawford | H05B 6/365 |
| 2017/0218823 A1* | 8/2017 | Crawford | F01N 3/2026 |
| 2017/0226907 A1* | 8/2017 | Crawford | H05B 6/108 |
| 2018/0187585 A1* | 7/2018 | Crawford | F01N 3/2013 |
| 2018/0252135 A1* | 9/2018 | Crawford | F01N 3/2026 |
| 2018/0280856 A1* | 10/2018 | Imada | B01D 53/9495 |

* cited by examiner

DEVICE FOR PURIFYING THE EXHAUST GASES OF A VEHICLE

CROSS-REFERENCE TO RELATED APPLICATIONS

This application is a U.S. non-provisional application claiming the benefit of French Application No. 19 08076, filed on Jul. 17, 2019, which is incorporated herein by reference in its entirety.

TECHNICAL FIELD

The present disclosure relates to a device for purifying the exhaust gases of a vehicle, the device defining an exhaust gas circulation passage configured to conduct the exhaust gases along a central axis of the exhaust gas circulation passage in a circulation direction from an upstream end of the device toward a downstream end of the device, said device comprising:
- a coil wound around the exhaust gas circulation passage and configured to generate an electromagnetic field;
- a magnetic flux concentrator, surrounding the coil, the magnetic flux concentrator being configured to conduct the electromagnetic field generated by the coil; and
- a purification substrate of the exhaust gases extending in the exhaust gas circulation passage, the purification substrate being made up of a ferromagnetic material and being suitable for being heated by induction of the electromagnetic field generated by the coil, the purification substrate comprising:
  - an upstream segment closing off the exhaust gas circulation passage and defining an upstream air gap with the magnetic flux concentrator, the upstream segment having, perpendicular to the central axis, an upstream section;
  - a downstream segment closing off the exhaust gas circulation passage and defining a downstream air gap with the magnetic flux concentrator, the downstream segment having, perpendicular to the central axis, a downstream section.

BACKGROUND

The exhaust lines of vehicles equipped with heat engines typically comprise catalytic purification devices, for example making it possible to convert NOx, CO and hydrocarbons into $N_2$, $CO_2$ and $H_2O$. Such members are only effective when the catalytic material is at a minimum temperature.

A problem arises upon starting the vehicle, when the engine is still cold and the exhaust gases produced are at an insufficient temperature to heat the catalytic material to a sufficient temperature for the purification members to become active.

To address this problem, it has been proposed to make the substrate of the purification devices from a ferromagnetic material and to heat the substrate by induction using a coil and magnetic flux concentrator surrounding the coil.

However, such a device is not fully satisfactory, since the magnetic field induced by the coil in the substrate is poorly distributed within the substrate and therefore generates nonhomogeneous heating, damaging the performance of the catalytics of the substrate.

SUMMARY

The disclosed device improves the distribution of the magnetic field in the purification substrate in order to obtain increased performance levels of the purification device.

To that end, the disclosure relates to a purification device of the aforementioned type, wherein the purification substrate further comprises at least one intermediate segment located in the exhaust gas circulation passage, between the upstream segment and the downstream segment, the intermediate segment having, perpendicular to the central axis, a central section smaller than the upstream section and/or the downstream section.

According to specific embodiments of the disclosure, the purification device also has one or more of the following features, considered alone or according to any technically possible combination(s):
- the intermediate segment comprises an upstream connecting segment and a downstream connecting segment, the upstream connecting segment being connected to the upstream segment and having an upstream connecting section smaller than the upstream section and the downstream connecting segment being connected to the downstream segment and having a downstream connecting section smaller than the downstream section, the upstream connecting segment and the downstream connecting segment connecting the upstream segment to the downstream segment;
- the intermediate segment comprises an upstream connecting segment and a downstream connecting segment, the upstream connecting segment being connected to the upstream segment and having an upstream connecting section smaller than the upstream section and the downstream connecting segment being connected to the downstream segment and having a downstream connecting section smaller than the downstream section, the intermediate segment comprising a central segment, the central segment having a central section smaller than the upstream connecting section and/or the downstream connecting section, the upstream connecting segment, the downstream connecting segment and the central segment connecting the upstream segment to the downstream segment;
- the ratio of the central section to the upstream and/or downstream section is less than 0.7, preferably less than 0.5;
- the upstream connecting segment and the downstream connecting segment are frustoconical, the angle of the cone defining the frustoconical shape of the upstream connecting segment and the downstream connecting segment being between 20° and 150°, preferably between 30° and 100°, then still more preferably between 40° and 90°;
- the purification substrate comprises:
- a one-piece upstream part comprising the upstream segment and an upstream region of the intermediate segment;
- a one-piece downstream part comprising the downstream segment and a downstream region of the intermediate segment;
  the upstream part and the downstream part being connected in a region of the intermediate segment;
- the upstream connecting segment and the downstream connecting segment comprise at least one cylindrical edge, the section of each cylindrical edge of the upstream connecting segment being comprised between the section of the upstream segment and the section of the central segment, the section of each cylindrical edge of the downstream connecting segment being between the section of the downstream segment and the section of the central segment;

the device comprises a rigid sleeve defining the exhaust gas circulation passage, the rigid sleeve being located between the purification substrate and the magnetic flux concentrator, the sleeve being fastened to the upstream segment and to the magnetic flux concentrator in the upstream air gap and being fastened to the downstream segment and to the magnetic flux concentrator in the downstream air gap;

the upstream segment comprises, on its periphery, an upstream maintaining collar, the downstream segment comprises, on its periphery, a downstream maintaining collar, the device comprising:

a maintaining ply located between the purification substrate and the magnetic flux concentrator, the maintaining ply being fastened on the one hand to the upstream segment and to the magnetic flux concentrator in the upstream air gap and on the other hand to the downstream segment and to the magnetic flux concentrator in the downstream air gap; and a rigid sleeve defining the exhaust gas circulation passage, the rigid sleeve being fastened to the inside of the maintaining ply and surrounding the purification substrate, the rigid sleeve extending between the upstream maintaining collar and the downstream maintaining collar;

an outer face of the intermediate segment and an inner face of the rigid sleeve define an annular vacuum; and the upstream maintaining collar and the downstream maintaining collar are made from a material that is less ferromagnetic than the material of the purification substrate.

The disclosure also relates to an exhaust line comprising a device for purifying exhaust gases of a vehicle as previously described.

The disclosure further relates to a vehicle comprising an exhaust line as previously described.

BRIEF DESCRIPTION OF THE DRAWINGS

Other features and advantages of the disclosure will appear upon reading the following description, provided solely as an example and done in reference to the appended drawings, in which.

DETAILED DESCRIPTION

Figure 1:
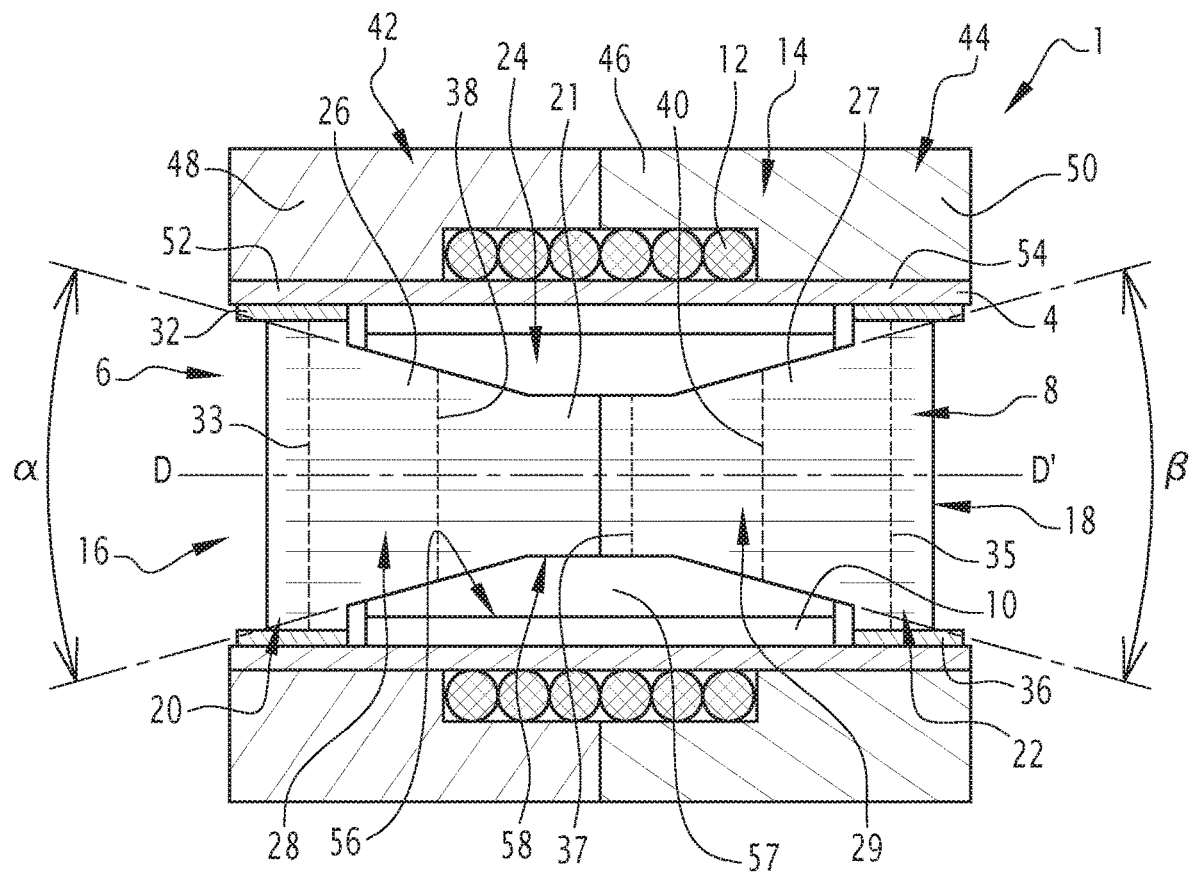
FIG. 1 is a schematic sectional view along a median vertical plane of a device for purifying exhaust gases according to a first embodiment of the disclosure.

A device for purifying exhaust gases 1, shown in FIG. 1, is suitable for being installed in an exhaust line mounted on board a vehicle, typically a vehicle equipped with a heat engine. This vehicle is typically a motor vehicle, for example a car or truck.

As shown in FIG. 1, the device 1 defines an exhaust gas circulation passage 6.

The passage 6 extends along a longitudinal axis D-D'. The passage 6 defines a circulation direction for the exhaust gases from an upstream end 16 of the device 1 toward a downstream end 18 of the device 1. The passage 6 is configured to conduct the exhaust gases, in particular generated by the heat engine, along the central passage axis D-D' and in the circulation direction of the exhaust gases.

The device 1 comprises a porous substrate 8 for purification of the exhaust gases extending in the passage 6.

The device 1 further comprises a coil 12 wound around the passage 6 and a magnetic flux concentrator 14 surrounding the coil 12.

The device 1 comprises a maintaining ply 4, inserted between the porous substrate 8 and the magnetic flux concentrator 14, in order to keep the porous substrate 8 in place.

A rigid sleeve 10 is fastened to the ply 4 and placed between the ply 4 and the substrate 8.

The substrate 8 comprises at least three segments: an upstream segment 20, a downstream segment 22 and an intermediate segment 24 between the upstream segment 20 and the downstream segment 22.

In a variant that is not shown, the substrate 8 comprises four segments, the intermediate segment 24 then comprising an upstream connecting segment 26 connected to the upstream segment 20 and a downstream connecting segment 27 connected to the downstream segment 22, the upstream connecting segment 26 and the downstream connecting segment 27 connecting the upstream segment 20 to the downstream segment 22.

In the variant shown in FIG. 1, the substrate comprises five segments, the intermediate segment 24 comprising, like in the preceding variant, an upstream connecting segment 26 and a downstream connecting segment 27, and also including a central segment 21, placed between the upstream connecting segment 26 and the downstream connecting segment 27 and connecting the upstream connecting segment 26 to the downstream connecting segment 27, the intermediate segment 24 connecting the upstream segment 20 to the downstream segment 22.

The substrate 8 comprises an unlimited number of segments and a variant comprising more than five segments is conceivable.

The substrate 8 is, for example, made from a ferromagnetic material. In a variant, the substrate comprises a ferromagnetic coating. The substrate, for example, includes a set of metal sheets wound in one another.

The substrate advantageously comprises a one-piece upstream part 28 as well as a one-piece downstream part 29. The upstream part 28, for example, comprises the upstream segment 20, and an upstream region of the intermediate segment 24. The downstream part 29, for example, comprises the downstream segment 22, and a downstream region of the intermediate segment 24. The upstream part 28 and the downstream part 29 are connected in a region of the intermediate segment 24, and more specifically in a region of the central segment 21.

The substrate 8 is suitable for being heated by induction of the electromagnetic field generated by the coil 12.

The upstream segment 20 extends along the longitudinal axis D-D'. The upstream segment 20 is, for example, cylindrical with axis of revolution D-D'. The upstream segment 20 is located in the passage 6. The upstream segment 20 closes off the passage 6 at the upstream end 16.

The upstream segment 20 has, perpendicular to the central axis D-D', an upstream section 33. The upstream section 33 is for example constant along the central axis D-D'.

The device 1 advantageously comprises an upstream maintaining collar 32 fastened to the upstream segment 20 and to the ply 4, connecting the upstream segment 20 to the ply 4. The upstream maintaining collar 32 is, for example, welded or soldered to the upstream segment 20. The upstream maintaining collar 32 is for example embedded in the ply 4.

The maintaining collar 32 is advantageously made from a less ferromagnetic and less porous material than the material of the substrate 8. It is, for example, made from a less flexible material than the material of the substrate 8.

The downstream segment 22 extends along the longitudinal axis D-D'. The downstream segment 22 is, for example, cylindrical with axis of revolution D-D'. The downstream segment 22 is located in the passage 6. The downstream segment closes off the passage 6 at the downstream end 18.

The downstream segment 22 has, perpendicular to the central axis D-D', a downstream section 35. The downstream section 35 is for example constant along the central axis D-D'.

The device 1 advantageously comprises a downstream maintaining collar 36 fastened to the downstream segment 22 and to the ply 4, and connects the downstream segment 22 to the ply 4. The downstream maintaining collar 36 is, for example, welded or soldered to the downstream segment 22. The downstream maintaining collar 36 is, for example, embedded in the ply 4.

The downstream maintaining collar 36 is advantageously made from a less ferromagnetic and less porous material than the substrate 8. It is, for example, made from a less flexible material than the material of the substrate 8. The intermediate segment 24 is located in the passage 6, between the upstream segment 20 and the downstream segment 22, and includes, in the embodiment shown in FIGS. 1 to 3, the central segment 21, the upstream connecting segment 26 and the downstream connecting segment 27.

The central segment 21 extends along the longitudinal axis D-D'. The central segment 21 is, for example, cylindrical with axis of revolution D-D'.

The central segment 21 has, perpendicular to the central axis D-D', a central section 37. The central section 37 is smaller than the upstream section 33 and the downstream section 35. The central section 37 is, for example, constant along the central axis D-D'. Advantageously, the ratio of the central section 37 to the upstream 33 and/or downstream 35 section is less than 0.7, preferably less than 0.5.

The upstream connecting segment 26 has, perpendicular to the longitudinal axis D-D', an upstream connecting section 38. The upstream connecting section 38 is smaller than the upstream section 33 and/or the downstream section 35. Advantageously, the upstream connecting section 38 is larger than the central section 37.

The upstream connecting segment 26 is advantageously frustoconical. The apical angle α of the cone defining the frustoconical shape of the upstream connecting segment 26 is between 20° and 150°, preferably between 30° and 100°, and still more preferably between 40° and 90°.

In a variant, the upstream connecting segment 26 is concave, for example trumpet-shaped. According to another variant, the upstream connecting segment 26 is convex.

The downstream connecting segment 27 has, perpendicular to the longitudinal axis D-D', a downstream connecting section 40. The downstream connecting section 40 is smaller than the upstream section 33 and/or the downstream section 35. Advantageously, the downstream connecting section 40 is larger than the central section 37.

The downstream connecting segment 27 is advantageously frustoconical. The apical angle β of the cone defining the frustoconical shape of the downstream connecting segment 27 is between 20° and 150°, preferably between 30° and 100°, and still more preferably between 40° and 90°.

In a variant, the downstream connecting segment 27 is concave, for example trumpet-shaped. According to another variant, the downstream connecting segment 27 is convex. The substrate 8 is thus hourglass-shaped.

The substrate 8 has two planes of symmetry. A first plane of symmetry comprises the axis D-D'. A second plane of symmetry is perpendicular to the axis D-D' and separates the substrate 8 into two parts of equal length.

The upstream connecting segment 26, the downstream connecting segment 27 and the central segment 21 are configured to conduct to the electromagnetic field generated by the coil 12 toward the central axis D-D' of the passage 6 for the exhaust gases.

Advantageously, the ratio of the projected length, along the axis D-D', of the upstream 20 and/or downstream 22 segment to the projected length, along the axis D-D', of the substrate 8, is between 0.10 and 0.99, and preferably between 0.25 and 0.90.

The coil 12 is suitable for generating an electromagnetic field.

More specifically, in the example illustrated in FIG. 1, the coil 12 is wound around the ply 4.

Figure 2:
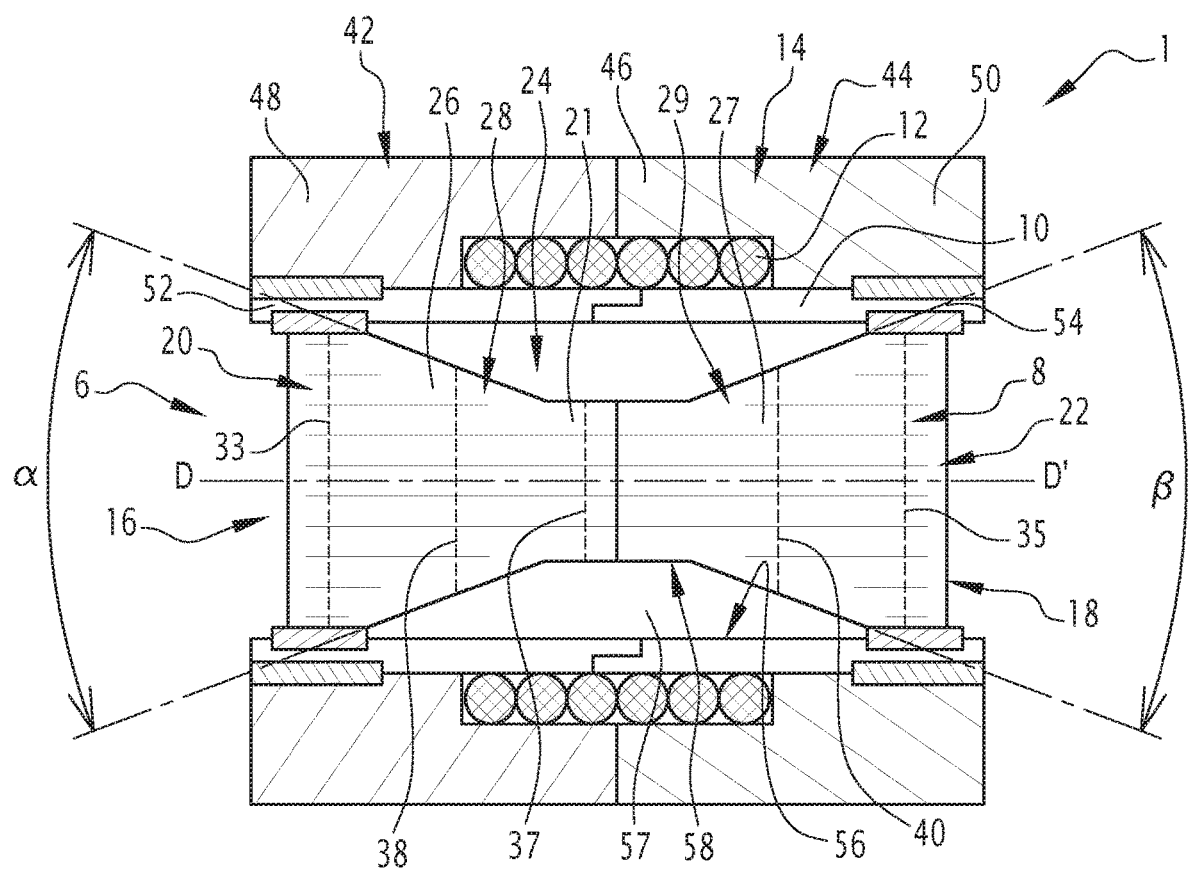
FIG. 2 is a view similar to FIG. 1 of a device for purifying exhaust gases according to a second embodiment of the disclosure.

The magnetic flux concentrator 14 is formed, in the example shown in FIGS. 1 and 2, by an upstream portion 42 and a downstream portion 44.

The magnetic flux concentrator 14 includes a tubular body 46, an upstream flange 48 and a downstream flange 50.

The magnetic flux concentrator 14, is configured to conduct the magnetic field generated by the coil 12.

The tubular body 46 surrounds the coil 12 and connects the upstream flange 48 to the downstream flange 50.

The upstream flange 48 extends radially toward the central axis D-D' relative to the tubular body 46. The upstream flange is located upstream from the coil 12. The upstream flange 48 defines, with the upstream segment 20, an upstream air gap 52.

The downstream flange 50 extends radially toward the central axis D-D' relative to the tubular body 46. The downstream flange is located downstream from the coil 12. The downstream flange 50 defines, with the downstream segment 22, a downstream air gap 54.

The ply 4 is fastened to the magnetic flux concentrator. The ply 4 advantageously extends between, on the one hand, the substrate 8 and the rigid sleeve 10, and on the other hand, the magnetic flux concentrator 14 and the coil 12. In particular, the ply 4 extends through the upstream air gap 52 and through the downstream air gap 54. The ply 4 is, for example, fastened to the upstream segment 20 and to the magnetic flux concentrator 14 in the upstream air gap 52 and is fastened to the downstream segment 22 and the magnetic flux concentrator 14 in the downstream air gap 54.

The rigid sleeve 10 is fastened to the inside of the ply 4 and surrounds the substrate 8. The rigid sleeve 10 defines the circulation passage.

The rigid sleeve 10 extends between the upstream maintaining collar 32 and the downstream maintaining collar 36.

An inner face 56 of the rigid sleeve 10 defines an annular vacuum 57 with an outer face 58 of the intermediate segment 24. The annular vacuum 57 is suitable for allowing the exhaust gases to circulate.

In a variant that is not shown, the rigid sleeve 10 fills the annular vacuum 57. According to this variant, the rigid sleeve 10 is advantageously formed from a material suitable for catalyzing the exhaust gases.

The outer diameter of the rigid sleeve 10 is, for example, similar to the outer diameter of the upstream segment 20 and the outer diameter of the downstream segment 22.

The rigid sleeve 10 is formed from a nonferromagnetic material. The rigid sleeve 10 is, for example, made from ceramic.

The operation of an exhaust gas purification device 1 according to the disclosure will now be described.

When exhaust gases circulate in the passage 6 but the temperature of the substrate 8 is not sufficient to ensure effective catalysis of the exhaust gases, an electric current is supplied in the coil 12. Alternatively, an electric current constantly supplies the coil 12 or an electric current supplies the coil 12 according to a rule programmed in an electric supply control member of the purification device.

The current circulating in the coil 12 generates a magnetic flux, hereinafter called magnetic flux generated by the coil.

The magnetic flux generated by the coil 12 is conducted by the magnetic flux concentrator 14 to the upstream airgap 52 and the downstream airgap 54, then is conducted by the substrate 8 into the passage 6.

The magnetic flux lines tend to follow the shortest possible path. The magnetic flux is therefore concentrated toward the periphery of the substrate relative to the central axis D-D'.

The periphery of the substrate 8 is close to the central axis D-D' in the central segment 21, in the upstream connecting segment 26 and in the downstream connecting segment 27, compared with the periphery of the substrate 8 in the upstream segment 20 and the downstream segment 22.

The magnetic flux is thus conducted toward the central axis D-D' of the passage 6 by the upstream connecting segment 26, the downstream connecting segment 27 and the central segment 21.

The substrate is heated by induction of the magnetic flux generated by the coil 12. The periphery of the substrate 8 is then more heated than the core of the substrate 8.

The geometry of the intermediate segment 24 thus orients the inductive heating generated by the coil 12 toward a central region of the passage 6, toward the central axis D-D'.

The exhaust gases circulating in the circulation direction within the passage 6 pass through the substrate 8 heated by induction. More specifically, the exhaust gases circulating on the periphery of the passage 6, that is to say, far away from the central axis D-D', are heated primarily by the upstream segment 20 and the downstream segment 22. The exhaust gases circulating in a central region of the passage 6, that is to say, close to the central axis D-D', are heated primarily by the central segment 21 as well as the upstream 26 and downstream 27 connecting segments.

The exhaust gases are then uniformly heated and treated at the outlet of the exhaust gas purification device 1.

The use of a central segment 21 having a central section 37 smaller than the upstream section 33 and the downstream section 35 is particularly advantageous to conduct the magnetic flux toward the central axis D-D' of the passage 6. Using such a central segment 21 as well as connecting segments 26, 27 configured to conduct the electromagnetic field generated by the coil 12 toward the central passage axis D-D' allows the advantageous heating of a region of the passage 6 close to the central axis D-D' and allows a uniform heating and treatment of the exhaust gases downstream from the device 1. This in particular allows increased performance levels of the purification device 1.

A ratio of the central section 37 to the upstream 33 and/or downstream 35 section of less than 0.7 as well as a ratio of the length of the upstream 20 and/or downstream 22 section along the central axis D-D' to the length of the substrate 8 that is between 0.10 and 0.99 concentrates the magnetic flux sufficiently around the central axis D-D' to heat the exhaust gases uniformly during their passage in the device, substantially improving the performance levels of the purification device 1.

The frustoconical shape of the upstream 26 and downstream 27 connecting segments, as well as the angle of the cones defining this shape of between 20° and 150°, ensures uniform heating of the exhaust gases downstream from the device 1 while simplifying the manufacture of the substrate 8.

The manufacture of the device 1 is further simplified by the use of an upstream part 28 and a downstream part 29 to form the substrate 8.

The use of a maintaining ply 4 as well as an upstream maintaining collar 32 and a downstream maintaining collar 36 makes it possible to ensure the structural integrity of the device 1 throughout the use thereof.

The upstream maintaining collar 32 and the downstream maintaining collar 36 formed from a material that is less ferromagnetic than the substrate is particularly advantageous to avoid excessive heating of the substrate 8 in the peripheral region thereof.

The sleeve 10 made from ceramic is easy to produce and ensures the rigidity and solidity of the device 1 over time, even under conditions specific to exhaust gas treatment.

FIG. 2 shows a second embodiment of the exhaust gas purification device 1. This embodiment differs from the first embodiment previously described only as follows. Similar elements bear the same references.

The device 1 does not include a maintaining ply 4 in the embodiment shown in FIG. 2. The rigid sleeve 10 is then located between the substrate 8 and the magnetic flux concentrator 14, and extends through the upstream air gap 52 and the downstream air gap 54.

More specifically, the rigid sleeve is fastened to the upstream segment 20 and to the magnetic flux concentrator 14 in the upstream air gap 52 and the rigid sleeve is fastened to the downstream segment 22 and the magnetic flux concentrator 14 in the downstream air gap 54.

The metal substrate 8 is, for example, soldered to the inside of the rigid sleeve 10 and the magnetic flux concentrator 14 is, for example, soldered to the outside of the rigid sleeve 10.

According to this embodiment, the coil 12 is wound around the sleeve 10.

This embodiment makes it possible to obtain a simplified purification device structure 1.

Figure 3:
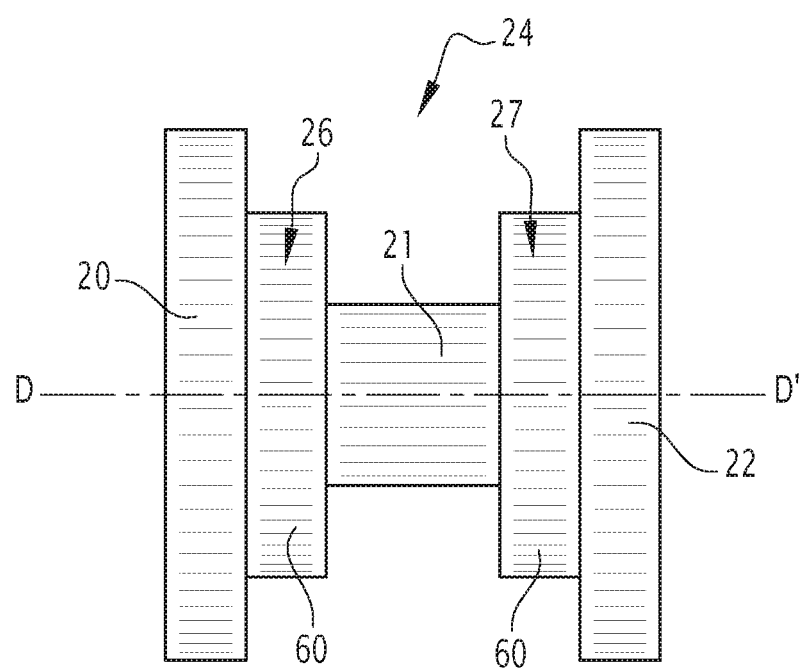
FIG. 3 is a schematic sectional view along a median vertical plane of a substrate of a device for purifying exhaust gases according to a third embodiment of the disclosure.

A substrate 8 according to a third embodiment is shown in FIG. 3. Such a substrate can replace the substrate described in the first and second embodiments.

The substrate 8 according to the third embodiment comprises an upstream segment 20, a downstream segment 22 and a central segment 21 as described in the first and second embodiments. In a variant, the central segment 21 is in one piece, as shown in FIG. 3. The upstream connecting segment 26 and the downstream connecting segment 27 differ from the segments previously described in that the upstream connecting segment 26 and the downstream connecting segment 27 comprise at least one cylindrical edge 60.

The section of each cylindrical edge 60 of the upstream connecting segment 26 is comprised between the section of the upstream segment 20 and the section of the central segment 21.

The section of each cylindrical edge 60 of the downstream connecting segment 27 is comprised between the section of the downstream segment 22 and the section of the central segment 21.

In the third embodiment, the upstream connecting segment 26 for example includes a stack of cylindrical edges 60, the section of each cylindrical edge 60 of the stack decreasing in the circulation direction.

The downstream connecting segment 27 for example includes a stack of cylindrical edges 60, the section of each cylindrical edge 60 of the stack increasing in the circulation direction.

The third embodiment in particular allows a simplified manufacture of the substrate 8.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A device for purifying exhaust gases of a vehicle, the device defining an exhaust gas circulation passage configured to conduct the exhaust gases along a central axis of the exhaust gas circulation passage in a circulation direction from an upstream end of the device toward a downstream end of the device, said device comprising:
   a coil wound around the exhaust gas circulation passage and configured to generate an electromagnetic field;
   a magnetic flux concentrator, surrounding the coil, the magnetic flux concentrator being configured to conduct the electromagnetic field generated by the coil; and
   a purification substrate of the exhaust gases extending in the exhaust gas circulation passage, the purification substrate being made up of a ferromagnetic material and being suitable for being heated by induction of the electromagnetic field generated by the coil, the purification substrate comprising:
   an upstream segment closing off the exhaust gas circulation passage and defining an upstream air gap with the magnetic flux concentrator, the upstream segment having, perpendicular to the central axis, an upstream section;
   a downstream segment closing off the exhaust gas circulation passage and defining a downstream air gap with the magnetic flux concentrator, the downstream segment having, perpendicular to the central axis, a downstream section;
   wherein the purification substrate further comprises at least one intermediate segment located in the exhaust gas circulation passage, between the upstream segment and the downstream segment, the intermediate segment having, perpendicular to the central axis, a central section smaller than the upstream section and/or the downstream section.

2. The device according to claim 1, wherein the intermediate segment comprises an upstream connecting segment and a downstream connecting segment, the upstream connecting segment being connected to the upstream segment and having an upstream connecting section smaller than the upstream section and the downstream connecting segment being connected to the downstream segment and having a downstream connecting section smaller than the downstream section, the upstream connecting segment and the downstream connecting segment connecting the upstream segment to the downstream segment.

3. The device according to claim 2, wherein the upstream connecting segment and the downstream connecting segment are frustoconical, an angle of a cone defining the frustoconical shape of the upstream connecting segment and the downstream connecting segment being between 20° and 150°.

4. The device according to claim 2, wherein the upstream connecting segment and the downstream connecting segment are frustoconical, an angle of a cone defining the frustoconical shape of the upstream connecting segment and the downstream connecting segment being between 30° and 100°.

5. The device according to claim 2, wherein the upstream connecting segment and the downstream connecting segment are frustoconical, an angle of a cone defining the frustoconical shape of the upstream connecting segment and the downstream connecting segment being between 40° and 90°.

6. The device according to claim 1, wherein the intermediate segment comprises an upstream connecting segment and a downstream connecting segment, the upstream connecting segment being connected to the upstream segment and having an upstream connecting section smaller than the upstream section and the downstream connecting segment being connected to the downstream segment and having a downstream connecting section smaller than the downstream section, the intermediate segment comprising a central segment, the central segment having a central section smaller than the upstream connecting section and/or the downstream connecting section, the upstream connecting segment, the downstream connecting segment and the central segment connecting the upstream segment to the downstream segment.

7. The device according to claim 6, wherein a ratio of the central section to the upstream and/or downstream section is less than 0.7.

8. The device according to claim 7, wherein the ratio of the central section to the upstream and/or downstream section is less than 0.5.

9. The device according to claim 6, wherein the upstream connecting segment and the downstream connecting segment are frustoconical, an angle of a cone defining the frustoconical shape of the upstream connecting segment and the downstream connecting segment being between 20° and 150°.

10. The device according to claim 6, wherein the upstream connecting segment and the downstream connecting segment are frustoconical, an angle of a cone defining the frustoconical shape of the upstream connecting segment and the downstream connecting segment being between 30° and 100°.

11. The device according to claim 6, wherein the upstream connecting segment and the downstream connecting segment are frustoconical, an angle of a cone defining the frustoconical shape of the upstream connecting segment and the downstream connecting segment being between 40° and 90°.

12. The device according claim 1, wherein the purification substrate comprises:
   a one-piece upstream part comprising the upstream segment and an upstream region of the intermediate segment;
   a one-piece downstream part comprising the downstream segment and a downstream region of the intermediate segment;
   the upstream part and the downstream part being connected in a region of the intermediate segment.

13. The device according to claim 1, wherein an upstream connecting segment and a downstream connecting segment comprise at least one cylindrical edge, a section of each cylindrical edge of the upstream connecting segment being comprised between a section of the upstream segment and a section of the central segment, a section of each cylindrical edge of the downstream connecting segment being between a section of the downstream segment and the section of the central segment.

14. The device according claim 1, comprising a rigid sleeve defining the exhaust gas circulation passage, the rigid sleeve being located between the purification substrate and the magnetic flux concentrator, the rigid sleeve being fastened to the upstream segment and to the magnetic flux concentrator in the upstream air gap and being fastened to the downstream segment and to the magnetic flux concentrator in the downstream air gap.

15. The device according to claim 14, wherein an outer face of the intermediate segment and an inner face of the rigid sleeve define an annular vacuum.

16. The device according to claim 1, wherein the upstream segment comprises, on a periphery of the upstream segment, an upstream maintaining collar, the downstream segment comprises, on a periphery of the downstream segment, a downstream maintaining collar, the device comprising:

a maintaining ply located between the purification substrate and the magnetic flux concentrator, the maintaining ply being fastened on one hand to the upstream segment and to the magnetic flux concentrator in the upstream air gap and on another hand to the downstream segment and to the magnetic flux concentrator in the downstream air gap; and a rigid sleeve defining the exhaust gas circulation passage, the rigid sleeve being fastened to an inside of the maintaining ply and surrounding the purification substrate, the rigid sleeve extending between the upstream maintaining collar and the downstream maintaining collar.

17. The device according to one of claim 16, wherein an outer face of the intermediate segment and an inner face of the rigid sleeve define an annular vacuum.

18. The device according to claim 16, wherein the upstream maintaining collar and the downstream maintaining collar are made from a material that is less ferromagnetic than a material of the purification substrate.

19. An exhaust line comprising the device for purifying exhaust gases of a vehicle according to claim 1.

20. A vehicle comprising the exhaust line according to claim 19.

* * * * *